United States Patent

[11] 3,539,170

| [72] | Inventor | Denis Marcel Hamel<br>Saint-Mande, France |
|---|---|---|
| [21] | Appl. No. | 741,445 |
| [22] | Filed | July 1, 1968 |
| [45] | Patented | Nov. 10, 1970 |
| [73] | Assignee | Pneumatiques, Caoutchouc Manufacture,<br>Et Plastiques Kleber-Colombes<br>Colombes, France<br>a French body corporate |
| [32] | Priority | July 5, 1967 |
| [33] | | France |
| [31] | | 113,269 |

[54] RUBBER AND LIKE MATERIAL SPRINGS
8 Claims, 7 Drawing Figs.

[52] U.S. Cl............................................... 267/63
[51] Int. Cl............................................... B60g 11/22
[50] Field of Search........................................ 267/1(53),
63

[56] References Cited
FOREIGN PATENTS

| 234,838 | 10/1944 | Switzerland.................. | 267/1(53)UX |
| 1,063,754 | 3/1967 | Great Britain................ | 267/1(53)UX |

*Primary Examiner*—James B. Marbert
*Attorney*—Holcombe, Wetherill & Brisebois

ABSTRACT: This invention relates to rubber and like material springs comprising layers of rubber bonded to intermediate metal plates and to parallel end plates to act mainly under compression but also in shear. According to the invention, the width of such a spring increases from one end to the other of the thicknesses of the rubber layers and the cross-sectional surfaces thereof are determined so as to ensure a substantially constant flexibility under compression or in shear whereby the ends of the spring have a good resistance to shear.

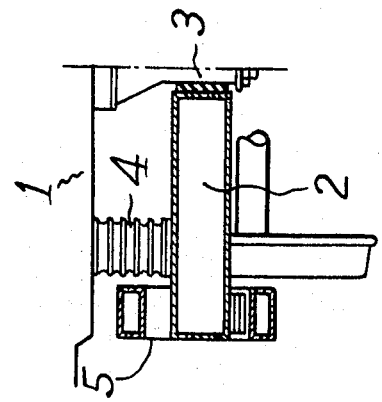
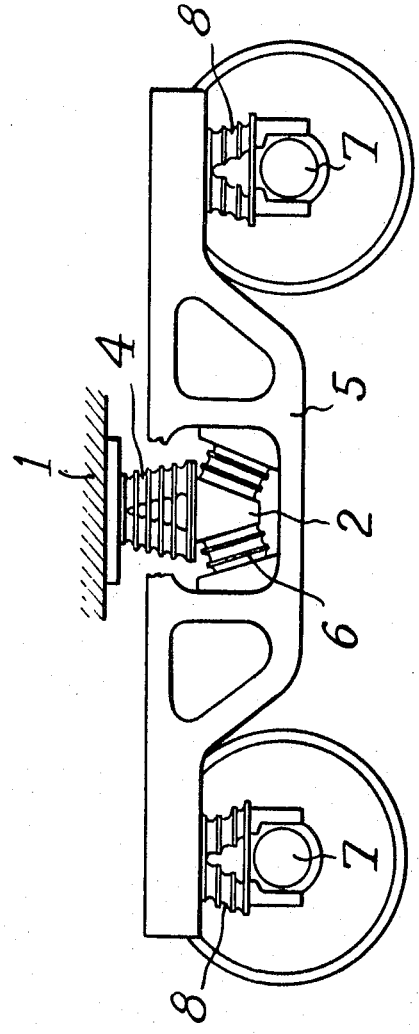

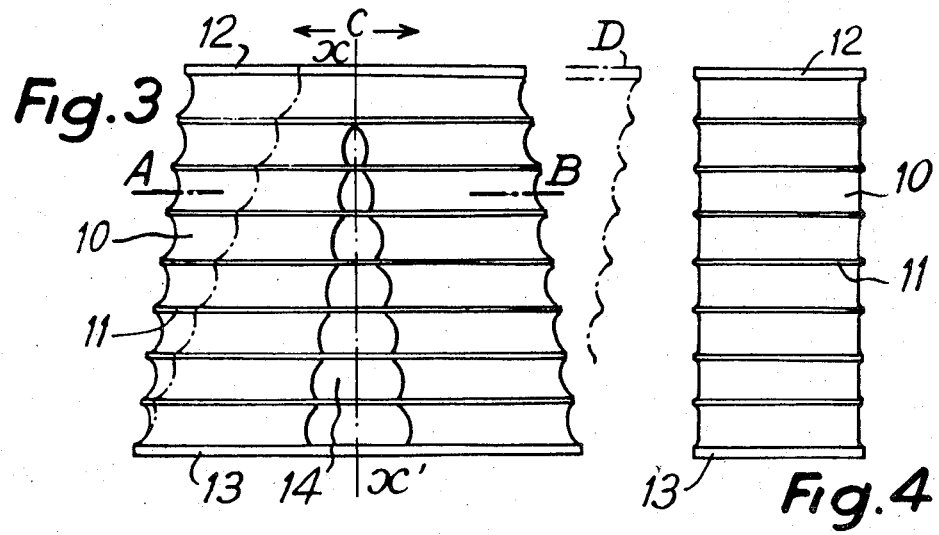
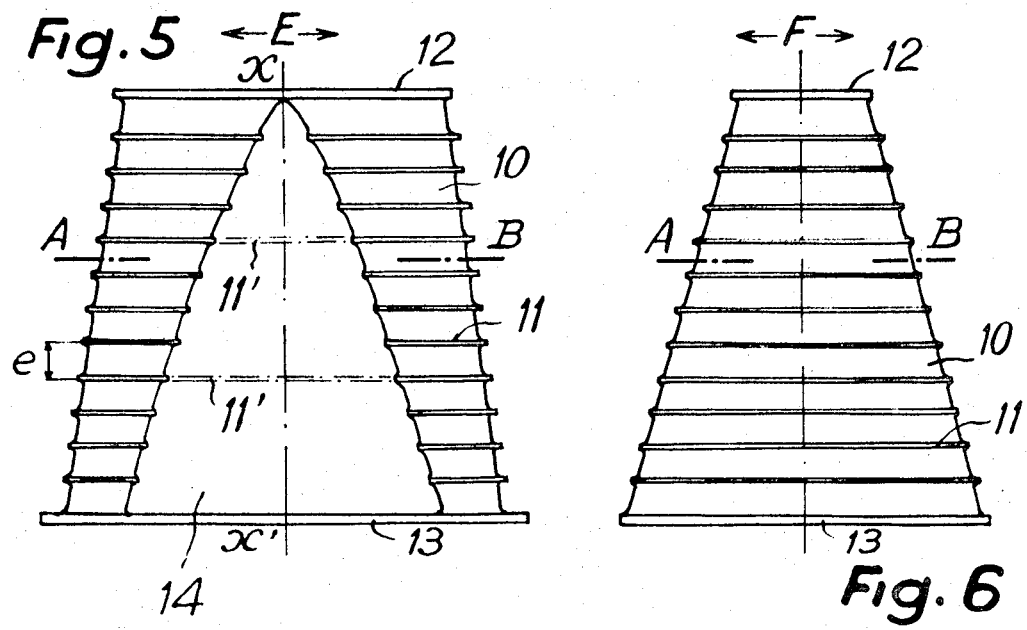
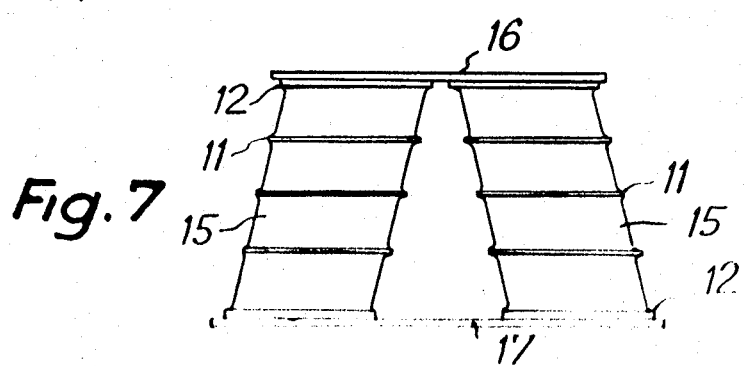

RUBBER AND LIKE MATERIAL SPRINGS

The present invention relates to improvements in rubber springs of the sandwich type comprising layers of rubber bonded to intermediate metal plates and end metal plates which are parallel to one another, the assembly as a whole forming a laminated elastic block. This type of rubber spring is mainly designed for compression under a load or stress applied perpendicularly to the metal plates but may also sometimes be used to resist shear stress when the load shifts in parallel to the metal plates thus displacing one end of the spring relatively to the other.

Springs of this type are used with advantage in vehicle suspensions, particularly in railway vehicles, since in addition to acting as a spring proper, they ensure the absorption of noise and vibrations produced as the vehicle runs along the track. Hence, use has already been made of springs of this type in various stages of railway vehicle suspension systems, particularly between the axle boxes and the bogie frame, between the bogie frame and the body of the vehicle or between the bogie frame and the bogie beam which supports the body of the vehicle through a kingpin and side spring assembly located at each end of the bogie beam. In suspensions of this type, the side spring assemblies located either between the bogie frame and the body of the vehicle or between the bogie beam and the body of the vehicle should possess a certain vertical elasticity in order suitably to support the weight of the body. They must also possess horizontal elasticity so as to permit, by the deformation under shear, the horizontal, transverse or longitudinal shift of the body of the vehicle relatively to the bogie frame which is caused, as the train takes a curve, by the rotation of the body about the bogie pin or by acceleration and braking. In the case of conventional side spring assemblies which take the form of cylinders or parallelepipeds, it is not always possible to achieve the desired degree of horizontal flexibility, since for a certain cross-sectional dimension of the spring and vertical flexibility required in order to support the load vertically by compression, the desired horizontal shear flexibility would necessitate increasing the height of the springs and the spring would thus become unstable and run the risk of buckling or overturning at the end positions when undergoing deformation under shear stress.

The invention thus relates to rubber springs of the type possessing a certain flexibility in compression, and high flexibility under shear stress combined with a greater stability in the end positions when under shear stress.

According to the invention, in a rubber spring of the type above described, the width of the spring as measured in the direction of displacement which causes the shear stress parallel to the metal plates, increases from one end of the spring to the other so as to give it an elongated base, while the thicknesses of the individual layers of rubber and the surfaces of the horizontal cross sections are calculated so as to achieve a substantially constant flexibility under compression and under shear stress at the different levels of the spring.

The thicknesses of the individual layers of rubber located between the intermediate and end metal plates, and the cross-sectional dimensions of these layers along planes parallel to the said plates, are preferably substantially constant from one end of the spring to the other so as to ensure a degree of flexibility which is substantially constant when the spring is under both compression and shear stress, at all levels of the spring.

This effect is achieved particularly by providing, in the layers of rubber constituting the spring, gaps or recesses which increase in width as they approach the widened base of the spring.

The spring preferably takes the form of an integral piece composed of layers of rubber bonded to end plates and intermediate plates. It may also take the form of spring elements having their axes inclined relatively to the metal plates, the said spring elements being mounted on common end plates.

In order that the invention may be more clearly understood, reference will now be made to the accompanying drawings which show embodiments thereof by way of example, and in which:

FIGS. 1 and 2 are diagrammatic elevationals and side views of the bogie of a railway vehicle equipped with rubber springs of the invention, FIGS. 3 and 4 and 5 and 6 are elevational and sectional views respectively of two embodiments of the invention, and FIG. 7 is an elevational view of another embodiment of the spring.

Referring now to the drawings, FIG. 1. shows a bogie in which a body 1 of a rail vehicle is carried by a bogie beam 2 by means of a center kingpin 3 and two side springs 4 located at either end of the bogie beam 2. This bogie beam 2 is in turn supported at its ends by a bogie frame 5 through rubber spring assemblies 6 located in V-form while the frame 5 is supported on axle boxes 7 by rubber springs 8. The bogie may also be provided with traction rods of conventional type (not shown) ensuring a connection between the supporting and supported portions of the suspension for the transmission of tractional and braking forces. In this bogie the springs 4 or 8 or both sets of springs may be of the type provided by the invention. The springs 4 act by compression in order vertically to support the load of the body 1 and by under shear in order to permit the transverse and longitudinal shift of the body 1 relatively to the bogie beam 2, the longitudinal shifts being due in particular to tractional and braking forces and to the pivoting movement of the body relatively to the bogie beam as the train or other rail vehicle passes around the curves. In the same way, the springs 8 act under compression in order vertically to support the weight of the body 1 and of the bogie and by shear action in order to permit relative longitudinal shift of the axle boxes 7 and bogie frame 5.

The side spring 4 is shown in greater detail in FIGS. 3 and 4. It is composed of layers of rubber 10 of equal thickness bonded to intermediate metal plates 11 and end plates 12 and 13, all of which are parallel to one another and perpendicular to the vertical axis X–X' of the spring, along which the load A is applied. This spring, as viewed in elevation (FIG. 3), has a width which increases from the upper plate 12 towards the lower plate 13 forming the elongated base but gaps or recesses 14 of a width, also increasing towards the base, are provided transversely within the rubber layers 10. As viewed in section (FIG. 4), the width of the spring is constant from one end to the other, its vertical front and rear faces being parallel to one another while the spring generally takes the form of a prism with two trapezoidal faces. The result is that the layers of rubber 10 of the said spring have surface cross sections (as viewed along planes parallel to the plates, such as A—B) which are substantially constant from the top to the bottom of the spring. With these layers of rubber of equal thickness, the spring is thus afforded a degree of flexibility when subjected to compressive and shear stresses which is substantially the same at all levels of the spring. On the other hand, the elongated base of the spring gives to it a high degree of horizontal flexibility in the longitudinal direction of the arrow C and improved stability in the end positions of deformation under shear stress such as the position shown in chain-dotted lines at D in FIG. 3. It will be apparent that the elongated base 13 of the spring increases its stability whereas the gaps or recesses 14 prevent a reduction in its vertical and horizontal flexibility along the line C, particularly in the lower layers of the spring.

The spring 8 shown in FIG. 1 is shown in greater detail in FIGS. 5 and 6. It takes the general external form of a truncated cone having a base elongated in a longitudinal direction (FIG. 5) and widened in a transverse direction (FIG. 6), thus increasing its stability in the end position of deformation under shear in the longitudinal direction along the arrow E and in the transverse direction along the arrow F. The substantially constant flexibility under vertical compression and horizontal shear stress along the lines E and F at the different levels of the spring is achieved firstly by providing, in the center portion of the layers of rubber 10, transverse gaps 14 the width of which increases more than do the external widths of the layers of rubber (FIG. 5) so that the cross sections, such as that along the line A—B, of the layers of rubber have horizontal surface areas which are substantially constant at all levels of the spring, and secondly, by ensuring that the vertical distance between the intermediate plates is such that the layers of rubber are all of equal thickness. In the spring shown, the intermediate plates 11 are interrupted adjacent the center gaps 14 in the layers of rubber so that the spring is constituted by two spring elements inclined one towards the other and connected only at their ends by plates 12 and 13. The intermediate plates 11 or some of the said plates may also be continuous from one side of the spring to the other as shown at 11' or as in the case of FIG. 3 when it is desired to increase the resistance to bending, of both spring elements. This is particularly dependent on the load which it is required to support vertically by compression.

The invention is, of course, in no way limited to the embodiments herein described and shown. Other variant embodiments may obviously be conceived depending upon the application envisaged. Thus, instead of constituting a single element, the spring may be composed of spring elements 15, the axis of which is inclined relatively to the intermediate plate 11 and the end plate 12, the said spring element 15 being mounted in the desired position on end backing plates 16 and 17 common to the spring elements (FIG. 7). On the other hand, in the two embodiments described, the parts of the spring may be differently inclined instead of being symmetrically inclined relatively to the transverse plane passing through the vertical axis X—X', for example in the case where the shear stresses along the arrows C or F would not be equal in each direction.

I claim:

1. In a rubber spring, particularly for use in vehicle suspension, of the type comprising layers of rubber bonded to intermediate metal plates and to end plates parallel to one another and serving to act mainly by compression in order to support a load applied perpendicularly to the plates and sometimes also under shear stress in the event of a longitudinal, horizontal displacement of the load parallel to the plates, the improvement which consists in that the width of the spring, as measured in the direction of action of the force which causes the shear stress, increases from one end of the spring to the other and that the thicknesses of the rubber layers and the cross-sectional areas of the said layers along planes parallel to the plates are determined so as to ensure substantially constant flexibilities under compression and under shear stress respectively at the various levels of the spring, thus ensuring, for given characteristics of flexibility of the spring under compression and shear stress, an increased stability at the end positions of deformation under shearing stress.

2. A spring according to claim 1, wherein the thicknesses of the individual rubber layers and the cross-sectional areas of the said layers along planes parallel to the plates are substantially constant from one end of the spring to the other.

3. A spring according to claim 1, wherein gaps or recesses of increasing width are provided in the layers of rubber.

4. A spring according to claim 3 wherein the general external shape of the spring is that of a prism having trapezoidal parallel front and rear faces.

5. A spring according to claim 3 wherein the general external shape of the spring is a truncated cone having a base widened in the longitudinal and transverse directions.

6. A spring according to claim 1 consisting of a single spring member having centrally arranged gaps in the layers of rubber increasing in width from the one end of the spring to the other, the intermediate metal plates being parallel to and equidistant from one another and extending between the layers across the gaps and the end plates extending across the end of each member.

7. A spring according to claim 1 consisting of a plurality of spring members each having a plurality of layers of rubber and intermediate metal plates parallel to one another and bonded to respective ones of the layers, the corresponding layers of individual spring members being spaced apart by gaps of a width which increases from the one end of the member to the other and the axes of the spring members being inclined towards one another.

8. A spring according to claim 7 including end plates coupling the respective ends of each of the spring members.